(12) United States Patent
Dosovitsky et al.

(10) Patent No.: US 10,599,680 B2
(45) Date of Patent: Mar. 24, 2020

(54) REDUCTION OF VOLUME OF REPORTING DATA USING MULTIPLE DATASETS

(71) Applicant: A10 Networks, Inc., San Jose, CA (US)

(72) Inventors: Gennady Dosovitsky, Sunnyvale, CA (US); Rajkumar Jalan, Saratoga, CA (US); Kishore Inampudi, Cupertino, CA (US)

(73) Assignee: A10 Networks, Inc., San Jose, CA (US)

( * ) Notice: Subject to any disclaimer, the term of this patent is extended or adjusted under 35 U.S.C. 154(b) by 198 days.

(21) Appl. No.: 15/471,869

(22) Filed: Mar. 28, 2017

(65) Prior Publication Data

US 2018/0285373 A1    Oct. 4, 2018

(51) Int. Cl.
*G06F 16/28*    (2019.01)
*H04L 29/08*   (2006.01)

(52) U.S. Cl.
CPC ........ *G06F 16/285* (2019.01); *H04L 67/2828* (2013.01)

(58) Field of Classification Search
CPC .. G06F 16/24556; G06F 16/28; G06F 16/285; H04L 67/2828; H04L 29/08
See application file for complete search history.

(56) References Cited

U.S. PATENT DOCUMENTS

2010/0161677 A1* 6/2010 Zurek ................... G06Q 10/06 707/802
2012/0016837 A1* 1/2012 Matsuda ........... G06F 17/30498 707/609
2014/0214888 A1* 7/2014 Marquardt .......... G06F 16/2228 707/769
2014/0351233 A1* 11/2014 Crupi ................ G06F 17/30516 707/706

OTHER PUBLICATIONS

Group Concat in SQL Server written by Quassnoi, Jun. 21, 2010, https://explainextended.com/2010/06/21/group_concat-in-sql-server/ (Year: 2010).*
"Reverse String Aggregation: Explode concatenated data into separate rows in PostgreSQL, SQL Server and MySQL" https://www.postgresonline.com/journal/archives/193-Reverse-String-Aggregation-Explode-concatenated-data-into-separate-rows-In-PostgreSQL,-SQL-Server-and-MySQL.html, Jan. 18, 2011 (Year: 2011).*

* cited by examiner

*Primary Examiner* — Robert W Beausoliel, Jr.
*Assistant Examiner* — Hau Hoang
(74) *Attorney, Agent, or Firm* — Keith Kline; The Kline Law Firm PC

(57) ABSTRACT

Decreasing a volume of data transfer over a network may commence with collecting a plurality of datasets having subscriber data. The method may continue with classifying data fields of each dataset of the plurality of datasets into low frequency change data and high frequency change data based on predetermined criteria. The method may further include combining a plurality of consecutive datasets of the plurality of datasets into a combination dataset. The combination dataset may include the low frequency change data and aggregated high frequency change data from the plurality of consecutive datasets. The method may continue with providing the combination dataset to a data processing node.

20 Claims, 9 Drawing Sheets

REDUCTION OF VOLUME OF REPORTING DATA USING MULTIPLE DATASETS

TECHNICAL FIELD

This invention relates generally to data networks and, more particularly, to reduction of volume of reporting data.

BACKGROUND

Service providers can provide services to multiple subscribers in a data network and collect reporting data related to network and subscriber behavior. The reporting data collected and delivered by network devices along a data path may need to be of high granularity and visibility. Therefore, the amount of the collected reporting data may rise due to the growth of throughput of the network devices, number of subscribers, and demand for high granularity of the reporting data collected by the network devices servicing the subscribers. The reporting data may be consolidated and processed by centralized analytics and reporting systems.

Specifically, the network devices may collect the reporting data and deliver the collected reporting data to specific network devices responsible for processing the collected reporting data and presenting a view of the network and subscriber behavior from different perspectives to the service providers. However, the centralized analytics and reporting systems may need to scale out and provide more network and computational resources for receiving and processing the growing amount of reporting data.

Additionally, multiple data records in the reporting data collected by the network devices can include duplicates, thus resulting in collecting and processing redundant data.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for decreasing data transfer over a network. According to one approach of the present disclosure, a system for decreasing data transfer over a network is provided. Specifically, the system may include a data collecting node and a data reporting node. The data collecting node may be configured to collect a plurality of datasets having subscriber data. The data collecting node may be further configured to classify data fields of each dataset of the plurality of datasets into low frequency change data and high frequency change data. The classifying may be performed based on predetermined criteria. The data reporting node may be configured to combine a plurality of consecutive datasets of the plurality of datasets into a combination dataset. The combination dataset may include the low frequency change data and aggregated high frequency change data from the plurality of consecutive datasets. The data reporting node may be further configured to provide the combination dataset to a data processing node.

According to another approach of the present disclosure, a method for decreasing data transfer over a network is provided. The method may commence with collecting a plurality of datasets having subscriber data. The method may continue with classifying data fields of each dataset of the plurality of datasets into low frequency change data and high frequency change data based on predetermined criteria. The method may further include combining a plurality of consecutive datasets of the plurality of datasets into a combination dataset. The combination dataset may include the low frequency change data and aggregated high frequency change data from the plurality of consecutive datasets. The method may continue with providing the combination dataset to a data processing node.

According to another approach of the present disclosure, a method for decreasing data transfer over a network is provided. The method may commence with collecting a plurality of datasets having subscriber data. The method may include classifying data fields of the plurality of datasets into low frequency change data and high frequency change data based on predetermined criteria. The method may continue with determining an analytical function to approximate the high frequency change data. The method may further include combining a plurality of consecutive datasets of the plurality of datasets into a combination dataset. The combination dataset may include the low frequency change data and function parameters associated with the analytical function. The method may further include providing the combination dataset to a data processing node. The data processing node may be configured to approximate the high frequency change data based on the analytical function and the function parameters.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
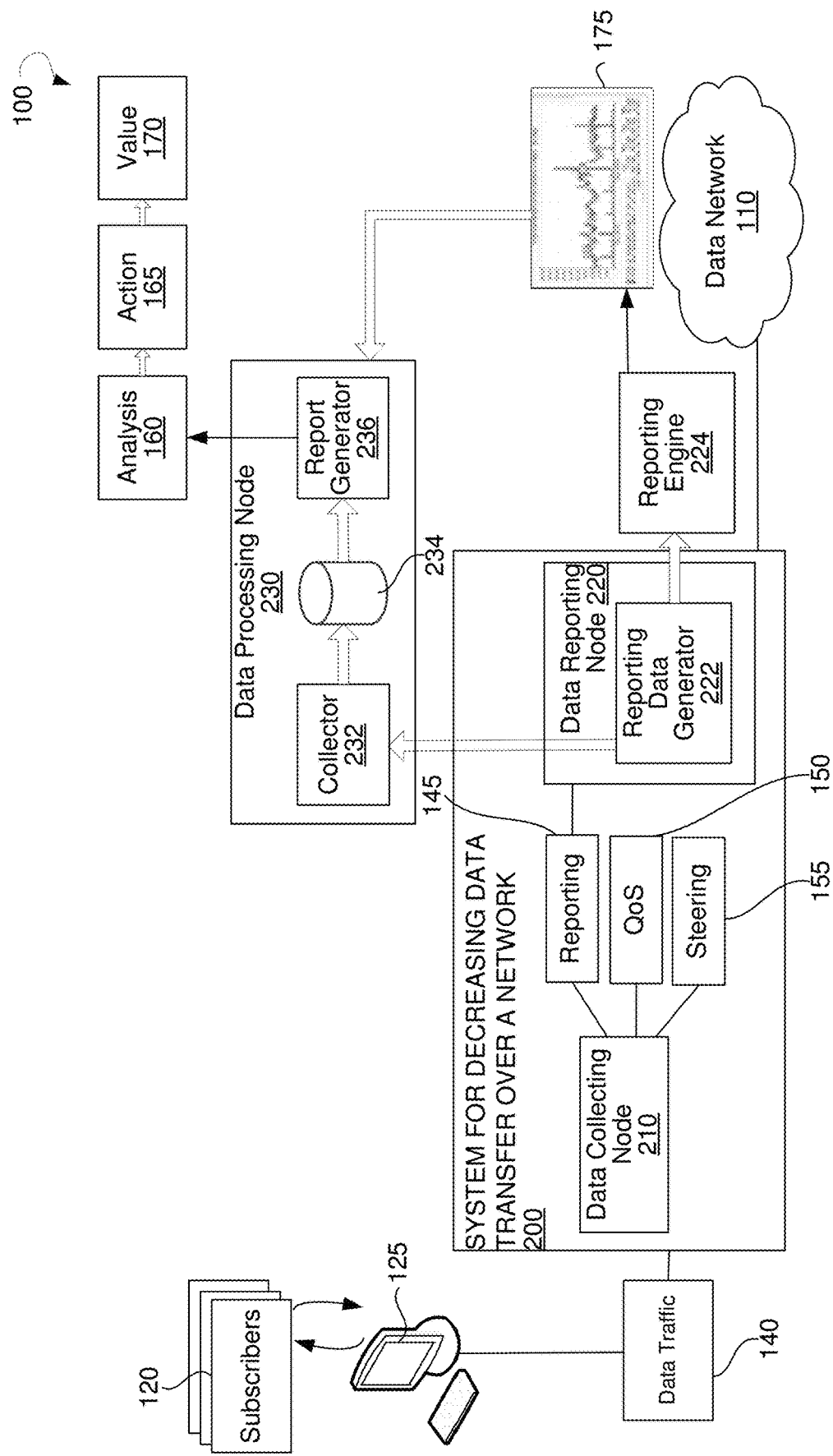
FIG. 1 shows an environment, within which methods and systems for decreasing data transfer over a network can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

As outlined in the summary, the embodiments of the present disclosure are directed to decreasing data transfer over a network. Subscriber data may be collected, consolidated, and analyzed to understand a data network state and subscriber behavior within the data network. The subscriber data may include metrics and statistics related to data traffic transferred between subscribers and a plurality of servers. A plurality of network devices may deliver specific subscriber data based on functions, location, and other capabilities of the network devices. A portion of the subscriber data, also referred to as low frequency change data, may be identical, i.e., duplicates, for all collected data records associated with the same subscriber or may change unfrequently (e.g., when a status of a subscriber registration in the data network changes). In an example embodiment, a portion of identical information or semi-permanent information that changes infrequently may reach 80 percent of the volume of the subscriber data. Another portion of the subscriber data, also referred to as high frequency change data, may be different for each collected data record of the subscriber data.

A network device of a system for decreasing data transfer over a network may collect multiple consecutive datasets of the subscriber data. The network device may classify data present in data fields of the collected datasets into the low frequency change data and the high frequency change data. The classification may be made based on predetermined criteria. The low frequency change data may be identical for all collected consecutive datasets. The network device may use the collected consecutive datasets to generate a combination dataset. The combination dataset may include the low frequency change data and aggregated high frequency change data from the collected consecutive datasets. More specifically, the high frequency change data from the collected consecutive datasets may be aggregated into the data fields of the combination dataset. In an example embodiment, the parameters associated with one of the consecutive datasets may be grouped into a single data field of the combination dataset. Therefore, in the combination dataset, each of the data fields storing the aggregated high frequency change data may store parameters for one of the collected consecutive datasets.

The combination dataset may be sent to a data processing node for further analysis and processing. Sending of the combination dataset may be delayed until a predetermined number of consecutive datasets are collected. Since one combination dataset is sent instead of multiple consecutive datasets, and the size of the combination dataset is lower than the size of the multiple consecutive datasets, the volume of the reporting data sent to the data processing node may be reduced.

According to one approach of the present disclosure, the network device may collect multiple datasets and classify data of the collected datasets into the low frequency change data and the high frequency change data. The network device may further analyze the high frequency change data to determine an analytical function that may be used to approximate the high frequency change data of the multiple datasets. Upon selection of the analytical function, the network device may determine function parameters associated with the analytical function. The network device may generate the combination dataset. More specifically, the combination dataset may include data fields storing the low frequency change data identical for all multiple datasets. The combination dataset may further include data fields storing the function parameters of the analytical function. The combination dataset may be sent to the data processing node.

The data processing node may receive the combination dataset and may use the function parameters to recreate the analytical function for the high frequency change data. Based on the low frequency change data from the combination dataset and the analytical function, the data processing node may analyze both the low frequency change data and the high frequency change data associated with the subscriber.

Referring now to the drawings, FIG. 1 illustrates an environment 100 within which methods and systems for decreasing data transfer over a network can be implemented. The environment 100 may include a data network 110 (e.g., a computing cloud), subscribers 120, subscriber devices 125, and a system 200 for decreasing data transfer over a network also referred to as a system 200. The subscribers 120 and the system 200 may be connected to the data network 110.

The subscribers 120 may include a person who uses services provided over the data network 110. The subscribers 120 may be associated with subscriber devices 125. The subscriber devices 125 may include a personal computer (PC), a laptop, a smartphone, a tablet PC, a television set, a mobile phone, an Internet phone, a netbook, a home gateway, a broadband gateway, a network appliance, a set top box, a media server, a personal media play, an access gateway, a networking switch, a server computer, a network storage computer, and so forth. When using the services, the subscribers 120 may use the subscriber devices 125 to send and receive data traffic 140 over the data network 110.

The data network 110 may be not limited to the computing cloud but may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network 110 may include a network of data processing nodes, also referred to as network nodes that may be interconnected for the purpose of data communication.

The system 200 may include a data collecting node 210 and a data reporting node 220. The data collecting node 210 may be responsible for collecting subscriber data associated with the data traffic 140. The subscriber data may include any data associated with the subscribers 120, the subscriber devices 125, and the data traffic 140. More specifically, the subscriber data may include data associated with activity of the subscribers 120 within the data network 110, such as subscriber-specific information, an amount of the data traffic 140, parameters of the data network 110, and so forth.

In an example embodiment, the data collecting node 210 may process the data traffic 140, extract parameters associated with the data traffic 140, and gather and accumulate metrics and statistics associated with the subscribers 120 and/or the data traffic 140. The data collecting node 210 may be responsible for performing reporting shown in a block 145, determining and/or providing quality of service shown in a block 150 associated with the data traffic 140, steering the data traffic shown in a block 155, and so forth. The data collecting node 210 may provide the collected subscriber data to the data reporting node 220.

The data reporting node 220 may include a reporting data generator 222. The reporting data generator 222 of the data reporting node 220 may receive the subscriber data from the data collecting node 210 in a form of reporting records. The reporting data generator 222 may format and/or restructure the reporting records and send the reporting records to the data processing node 230. In an example embodiment, the data reporting node 220 may send the reporting records to a reporting engine 224. The reporting engine 224 may be an external reporting engine, e.g. a reporting engine that is not part of the system 200. The reporting engine 224 may be configured to perform real-time reporting and offline reporting. Specifically, the reporting engine 224 may provide data associated with the reporting records as a report 175. In an example embodiment, the report 175 may be provided in a form of a diagram illustrating the data associated with the reporting records. The reporting engine 224 may send the report 175 to the data processing node 230.

In an example embodiment, the data processing node 230 may be configured as a centralized reporting platform configured to perform analysis of the reporting records. The data processing node 230 may analyze the reporting records offline, i.e. not in real-time in the course of collecting of the reporting records. The data processing node 230 may include a collector 232, a storage node 234, and a report generator 236. The collector 232 of the data processing node 230 may receive the reporting records from the data reporting node 220. The reporting records may be stored in the storage node 234. The report generator 236 of the data processing node 230 may perform an analysis 160 of the reporting records. In some example embodiments, the data processing node 230 may further receive, from the reporting engine 224, the data associated with the reporting records as the report 175. The data processing node 230 may further analyze the report 175. Based on the analysis 160, actions 165 to be taken based on analyzing the behavior of the subscribers 120 and the data network 110 may be determined. Furthermore, value 170 associated with servicing the subscribers 120 may be determined.

Figure 2:
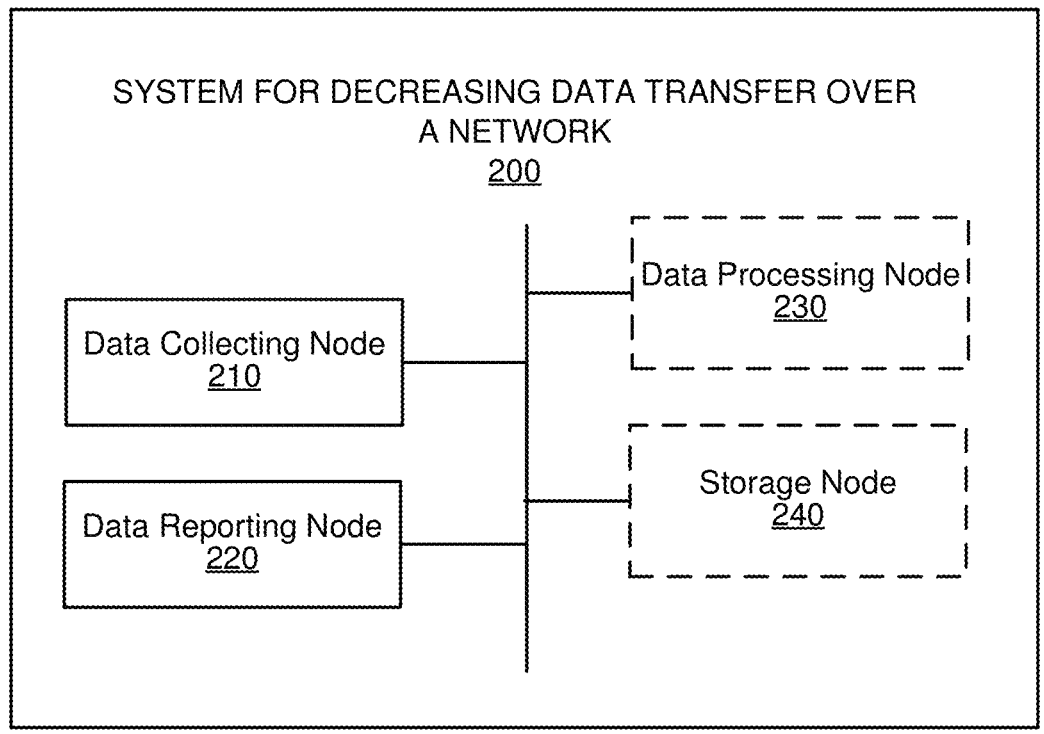
FIG. 2 shows a block diagram illustrating various modules of a system for decreasing data transfer over a network.

FIG. 2 shows a block diagram illustrating various modules of a system 200 for decreasing data transfer over a network, according to an example embodiment. Specifically, the system 200 may include a data collecting node 210, a data reporting node 220, and optionally a data processing node 230 and a storage node 240. The data collecting node 210 may be configured to collect a plurality of datasets having subscriber data. Upon collecting the plurality of datasets, the data collecting node 210 may classify data fields of each dataset of the plurality of datasets into low frequency change data and high frequency change data. The classifying may be performed based on predetermined criteria.

Figure 3:
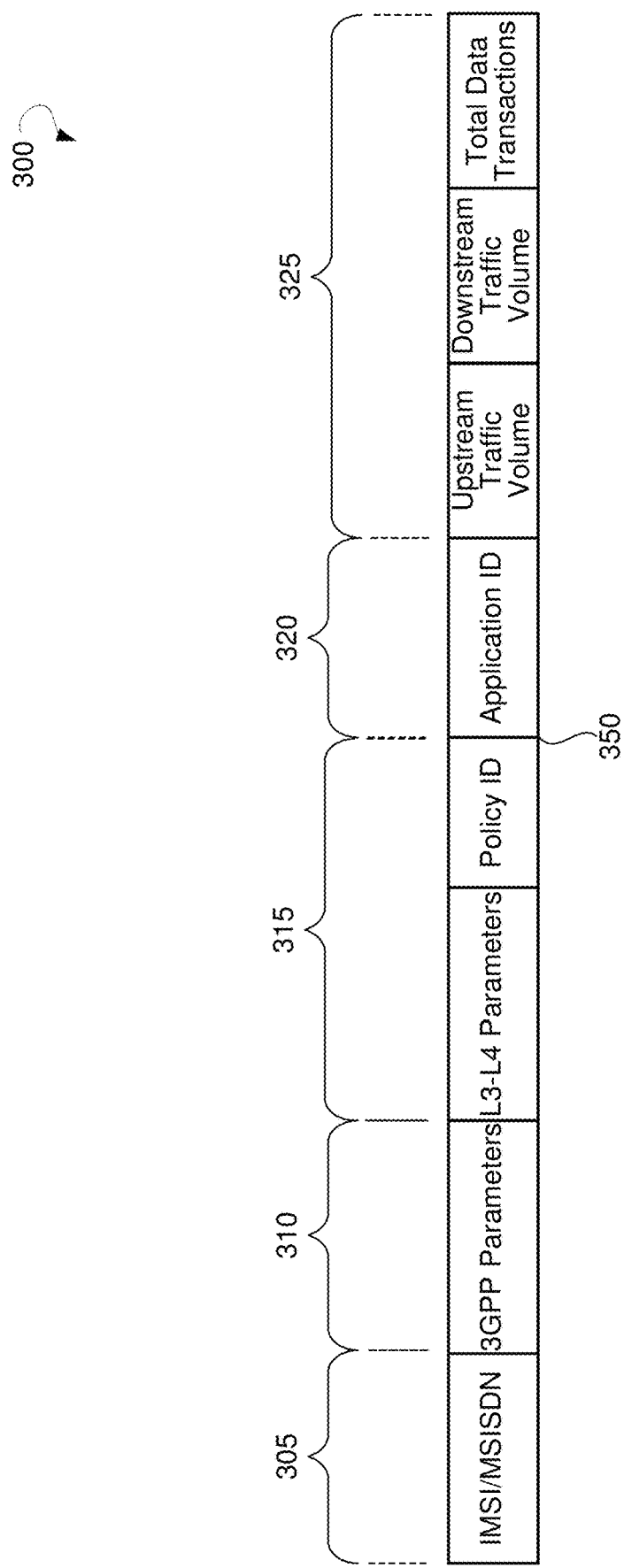
FIG. 3 is a block diagram illustrating subscriber data collected by a system for decreasing data transfer over a network.

FIG. 3 is a block diagram 300 illustrating a dataset of the subscriber data collected by the system 200, according to an example embodiment. The dataset may be collected in a form of a reporting record. A reporting record 350 may have a plurality of data fields 305, 310, 315, 320, and 325. The data fields 305, 310, 315, 320, and 325 may include different types of data: data that may be permanent for the same subscriber, data that may change infrequently, data that may be different for different applications used by the subscriber, and data that may be different in each of the plurality of reporting records. More specifically, the data field 305 may include an International Mobile Subscriber Identity (IMSI) or a Mobile Subscriber Integrated Services Digital Number (MSISDN) which may be permanent for the same subscriber. The data field 310 may include 3rd Generation Partnership Project (3GPP) parameters. The data fields 315 may include Layer 3-Layer 4 (L3-L4) parameters (e.g., Internet Protocol (IP) addresses, Transmission Control Protocol ports, User Datagram Protocol ports, and so forth). More specifically, Layer 3 may include a network layer providing transferring variable length data sequences from one node to another connected to the same data network. Layer 4 may include a transport layer providing transferring variable length data sequences from a source to a destination host via one or more data networks. The data fields 315 may further include a policy identifier (ID) associated with the subscriber. The data fields 315 may change infrequently for the same subscriber. The data field 320 may include an application ID associated with the subscriber, which may be different for each application running on the subscriber device. The data fields 325 may include an upstream traffic volume sent by the subscriber, a downstream traffic volume received by the subscriber, and total number of data transactions associated with the subscriber. The data in the data fields 325 may be different for each reporting record associated with the subscriber.

The data collecting node may analyze the frequency of changing data in each of the data fields 305, 310, 315, 320, and 325. Based on the analysis performed according to predetermined criteria, the data collecting node may classify the data of the data fields 305, 310, 315, and 320 to be the low frequency change data and may classify the data of the data fields 325 to be the high frequency change data.

Referring again to FIG. 2, the low frequency change data may include subscriber identifying data. The subscriber identifying data may be identical for all of the plurality of consecutive datasets. The subscriber identifying data may include at least one of the following: a subscriber primary unique identifier, a MSISDN, International Mobile Subscriber Identity (IMSI), a user name, a subscriber network identity, a phone number, a media access control (MAC) address, a public IP address, a private IP address, Virtual Local Area Network Identifier (VLAN ID), a vehicle identification number (VIN), a subscriber location information, a tunnel ID, 3rd Generation Partnership Project (3GPP) location information, subscriber group information, a policy associated with a subscriber, a subscriber location, a source of data traffic, a device type, an Operating System (OS) type, information describing the subscriber, information describing a group of subscribers, and information describing at least one of a device, a host, a household, a data channel, and a neighborhood, and so forth.

The high frequency change data may differ for each of the plurality of consecutive datasets. In an example embodiment, the high frequency change data may include parameters of data traffic sent and received by the subscriber at each moment of time.

The data reporting node 220 of the system 200 may be configured to determine that a number of the plurality of consecutive datasets exceeds a predetermined number of consecutive datasets. Based on such determination, the data reporting node 220 may initiate combining a plurality of consecutive datasets of the plurality of datasets into a combination dataset. The combination dataset may include the low frequency change data and aggregated high frequency change data from the plurality of consecutive datasets. The data reporting node 220 may be configured to provide the combination dataset to the data processing node 230. The low frequency change data and the aggregated high frequency change data may be stored in data fields of the combination dataset. Each of the data fields storing the aggregated high frequency change data may have a plurality of parameters associated with one of the plurality of consecutive datasets.

Figure 4:
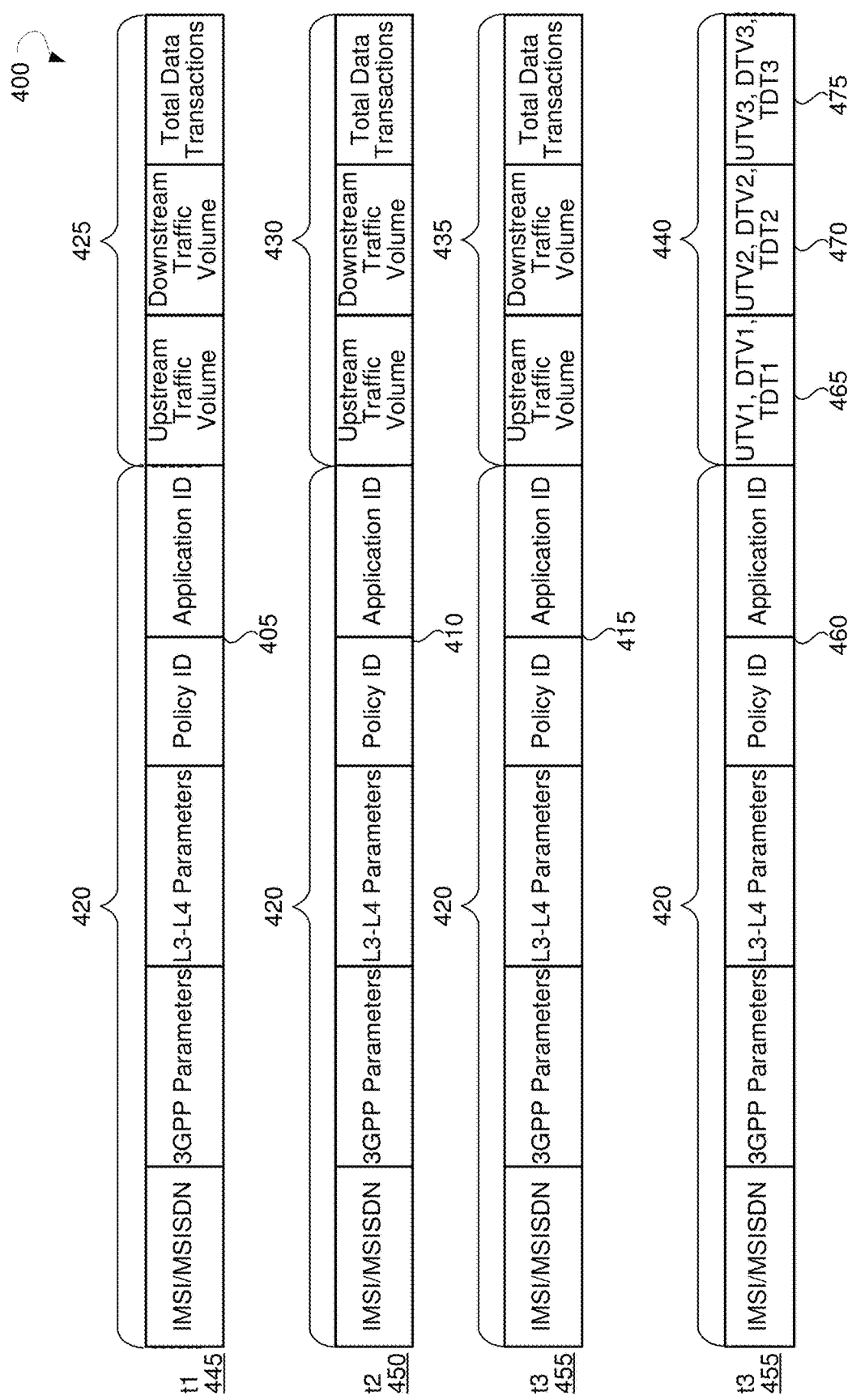
FIG. 4 is a block diagram showing a combination dataset generated based on multiple datasets of subscriber data.

FIG. 4 is a block diagram 400 showing a combination dataset generated based on multiple datasets of the subscriber data, according to an example embodiment. The data collecting node may receive a plurality of consecutive datasets shown as datasets 405, 410, and 415. Each of the datasets 405, 410, and 415 may have data fields having low frequency change data 420 and data fields having high frequency change data 425, 430, and 435. The low frequency change data 420 may be identical for all datasets 405, 410, and 415. The high frequency change data 425, 430, and 435 may be different in each of the datasets 405, 410, and 415.

The datasets 405, 410, and 415 may be received at time points t1, t2, and t3, respectively, shown as time points 445, 450, and 455. At time point 455, the data reporting node may determine that a number of the datasets 405, 410, and 415 reached a predetermined number of datasets. Based on such determination, the data reporting node may generate a combination dataset 460 at time point 455. The combination dataset 460 may include data fields having the low frequency change data 420 and data fields having aggregated high frequency change data 440. The aggregated high frequency change data 440 may include a combination of the high frequency change data 425, 430, and 435. More specifically, the aggregated high frequency change data 440 may be stored in data fields 465, 470, and 475 of the combination dataset 460. The data field 465 may include the high frequency change data 425 of the dataset 405, the data field 470 may include the high frequency change data 430 of the dataset 410, and the data field 475 may include the high frequency change data 435 of the dataset 415.

Instead of sending multiple datasets 405, 410, and 415, the data reporting node may send only the combination dataset 460. A size of the combination dataset 460 may be lower than a cumulative size of the datasets 405, 410, and 415. Therefore, the volume of reporting data sent by the data reporting node to the data processing node in a form of the combination dataset 460 may be reduced.

Referring again to FIG. 2, in an example embodiment, the data reporting node 220 may classify data fields of the plurality of datasets into the low frequency change data and the high frequency change data, and may determine an analytical function to be used for the approximation of the high frequency change data. A type of the analytical function may be selected based on predetermined criteria. Based on the analytical function, the data reporting node 220 may determine function parameters associated with the analytical function. An accuracy of the approximation of the high frequency change data may be based on the function parameters. In an example embodiment, the accuracy of the approximation may increase with an increase in a power of the analytic function. In some example embodiments, the power selected for the analytic function may range from one to fifty. Therefore, the function parameters may include coefficients associated with the power of the analytic function. Any other power of the analytic function may be selected for approximation of the high frequency change data based on predetermined criteria.

Upon determining the function parameters, the data reporting node 220 may combine a plurality of consecutive datasets into a combination dataset. More specifically, the combination dataset may include the low frequency change data and the function parameters associated with the analytical function. The low frequency change data and the function parameters associated with the analytical function may be stored in data fields of the combination dataset. The data reporting node 220 may be configured to provide the combination dataset to the data processing node 230. The data processing node 230 may be configured to receive the combination dataset and recreate the analytical function based on the function parameters present in the combination dataset. Based on the function parameters and the analytical function, the data processing node 230 may restore and analyze the high frequency change data. The data processing node 230 may be further configured to approximate the high frequency change data based on the analytical function and the function parameters.

The storage node 240 may be configured to store the plurality of datasets, the combination dataset, and any other data needed for generating and processing the reporting data.

Figure 5:
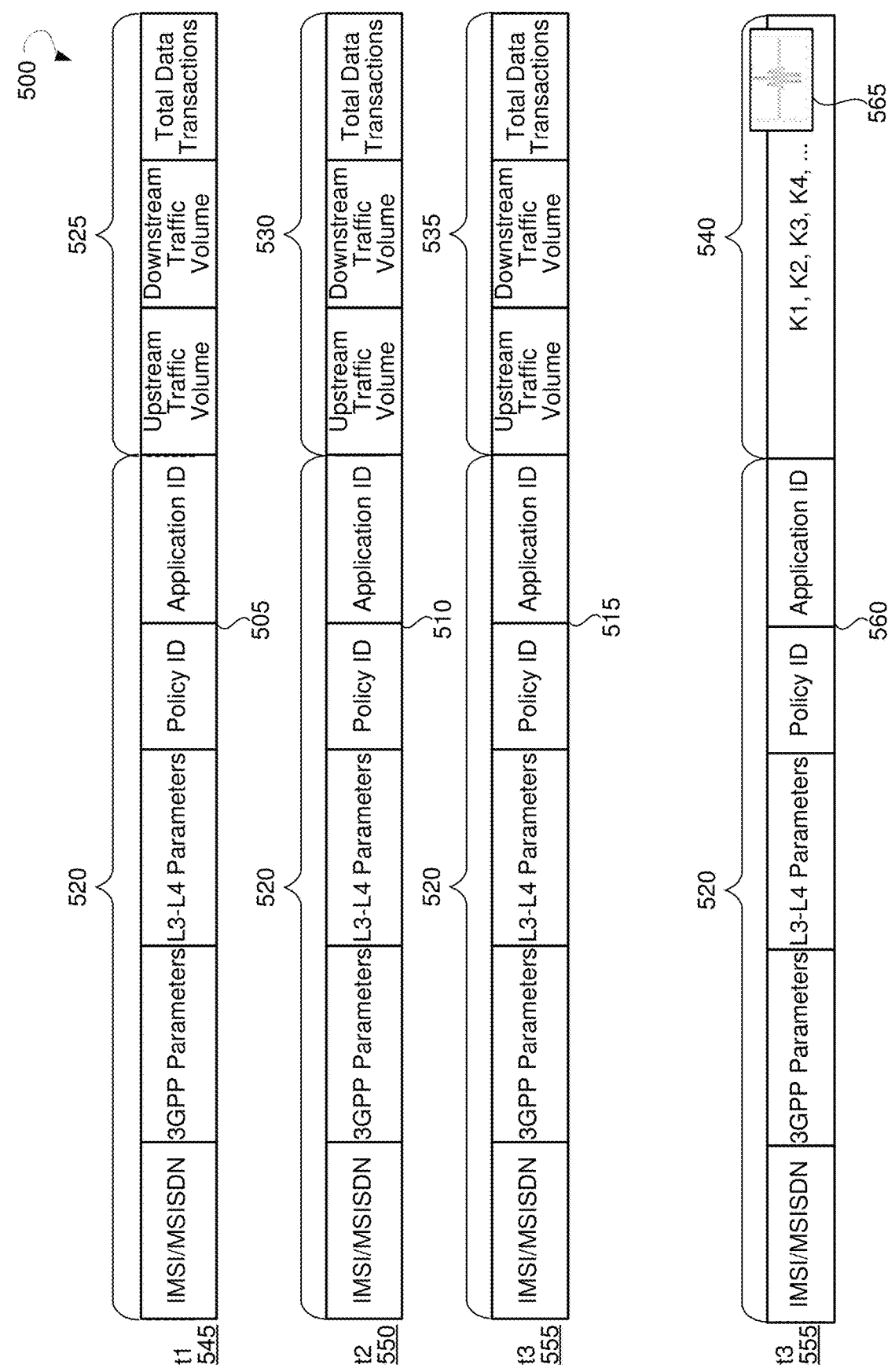
FIG. 5 is a block diagram illustrating a combination dataset generated based on multiple datasets of subscriber data.

FIG. 5 is a block diagram 500 showing a combination dataset generated based on multiple datasets of the subscriber data, according to an example embodiment. The data collecting node may receive a plurality of consecutive datasets shown as datasets 505, 510, and 515. Each of the datasets 505, 510, and 515 may have data fields having low frequency change data 520 and data fields having high frequency change data 525, 530, and 535, respectively. The low frequency change data 520 may be identical for all datasets 505, 510, and 515. The high frequency change data 525, 530, and 535 may be different in each of the datasets 505, 510, and 515.

The datasets 505, 510, and 515 may be received at time points t1, t2, and t3, respectively, shown as time points 545, 550, and 555. At time point 555, the data reporting node may determine that a number of the datasets 505, 510, and 515 reached a predetermined number of datasets. Based on such determination, the data reporting node may generate a combination dataset 560 at time point 555. The combination dataset 560 may include data fields having low frequency change data 520 and data fields having function parameters 540. The function parameters 540 may be associated with an analytical function 565 for approximating the high frequency change data 525, 530, and 535.

Instead of sending multiple datasets 505, 510, and 515, the data reporting node may send only the combination dataset 560. A size of the combination dataset 560 may be less than a cumulative size of the datasets 505, 510, and 515. Therefore, the volume of reporting data sent by the data reporting node to the data processing node in a form of the combination dataset 560 may be reduced.

Figure 6:
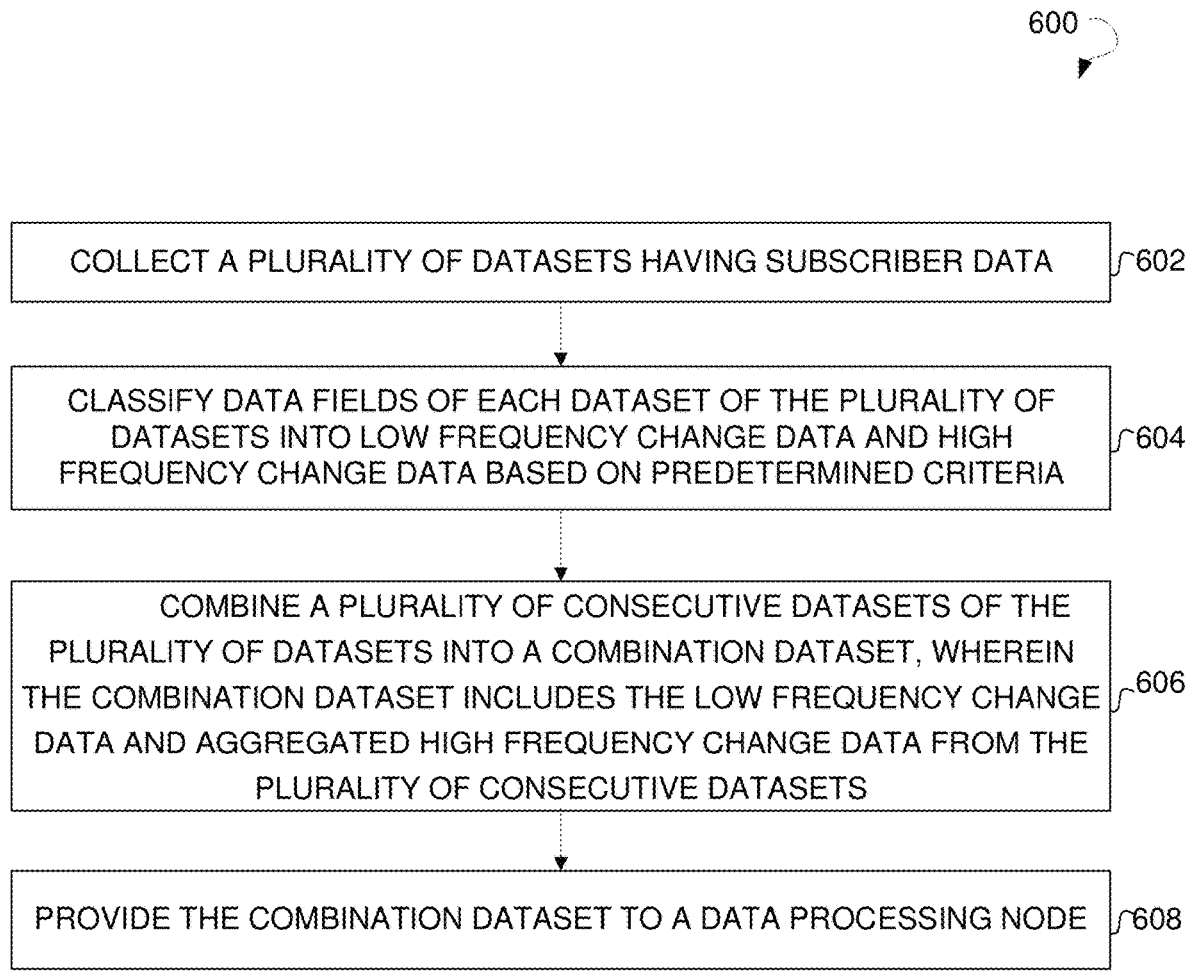
FIG. 6 shows a process flow diagram of a method for decreasing data transfer over a network.

FIG. 6 shows a process flow diagram of a method 600 for decreasing data transfer over a network, according to an example embodiment. In some embodiments, the operations may be combined, performed in parallel, or performed in a different order. The method 600 may also include additional or fewer operations than those illustrated. The method 600 may be performed by processing logic that may comprise hardware (e.g., decision making logic, dedicated logic, programmable logic, and microcode), software (such as software run on a general-purpose computer system or a dedicated machine), or a combination of both.

The method 600 may commence with collecting, by at least one network device, such as the data collecting node 210 as shown on FIG. 2, a plurality of datasets having subscriber data at operation 602. The method 600 may continue with classifying, by the at least one network device, data fields of each dataset of the plurality of datasets into low frequency change data and high frequency change data at operation 604. The classifying may be performed based on predetermined criteria.

In an example embodiment, the low frequency change data may include subscriber identifying data. The subscriber identifying data may include at least one of the following: a subscriber primary unique identifier, an MSISDN, IMSI, a user name, a subscriber network identity, a phone number, a MAC address, a public IP address, a private IP address, a VLAN ID, a VIN, a subscriber location information, a tunnel ID, 3GPP location information, subscriber group information, a policy associated with a subscriber, a subscriber location, a source of data traffic, a device type, an OS type, information describing the subscriber, information describing a group of subscribers, information describing at least one of a device, a host, a household, a data channel, and a neighborhood, and so forth. The device may include the subscriber device.

Optionally, the method 600 may include determining, by the at least one network device, such as the data reporting node 220 as shown on FIG. 2, that a number of the plurality of consecutive datasets exceeds a predetermined number of consecutive datasets. Based on such determination, the at least one network device may combine the plurality of consecutive datasets into a combination dataset at operation 606. The combination dataset may include the low frequency change data and aggregated high frequency change data from the plurality of consecutive datasets. More specifically, the low frequency change data and the aggregated high frequency change data may be stored in data fields of the combination dataset. In an example embodiment, each of the data fields storing the aggregated high frequency change data may include a plurality of parameters associated with one of the plurality of consecutive datasets. The method 600 may continue with operation 608, at which the combination dataset may be provided to a data processing node.

Figure 7:
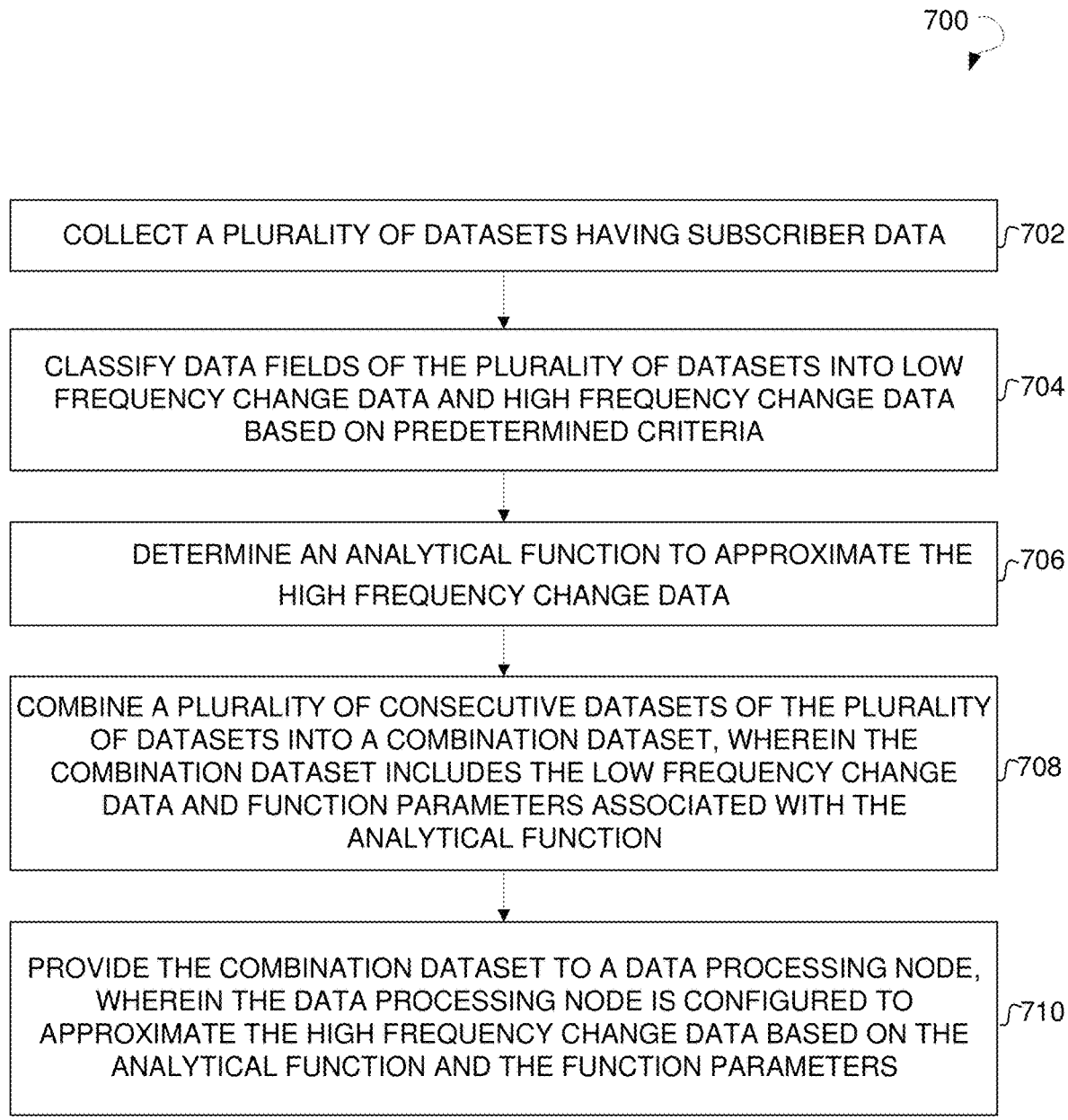
FIG. 7 shows a process flow diagram of a method for decreasing data transfer over a network.

FIG. 7 shows a process flow diagram of a method 700 for decreasing data transfer over a network, according to an example embodiment. In some embodiments, the operations may be combined, performed in parallel, or performed in a different order. The method 700 may also include additional or fewer operations than those illustrated. The method 700 may be performed by processing logic that may comprise hardware (e.g., decision making logic, dedicated logic, programmable logic, and microcode), software (such as software run on a general-purpose computer system or a dedicated machine), or a combination of both.

The method 700 may commence with collecting, by at least one network device, a plurality of datasets having subscriber data at operation 702. At operation 704, the at least one network device may classify data fields of the plurality of datasets into low frequency change data and high frequency change data based on predetermined criteria.

The method 700 may further include determining, by the at least one network device, an analytical function to approximate the high frequency change data at operation 706. Furthermore, function parameters associated with the analytical function may be determined. The function parameters may include coefficients representing a power of the analytical function. An accuracy of the approximation of the high frequency change data may be based on the function parameters. The accuracy may increase with an increase in the power of the analytical function. The low frequency change data and the function parameters associated with the analytical function may be stored in data fields of the combination dataset.

The method 700 may continue with operation 708, at which the at least one network device may combine a plurality of consecutive datasets of the plurality of datasets into a combination dataset. The combination dataset may include the low frequency change data and the function parameters associated with the analytical function.

The method 700 may further include providing, by the at least one network device, the combination dataset to a data processing node at operation 710. The data processing node may be configured to recreate the analytical function based on the function parameters. The data processing node may be further configured to approximate the high frequency change data based on the analytical function and the function parameters.

Figure 8:
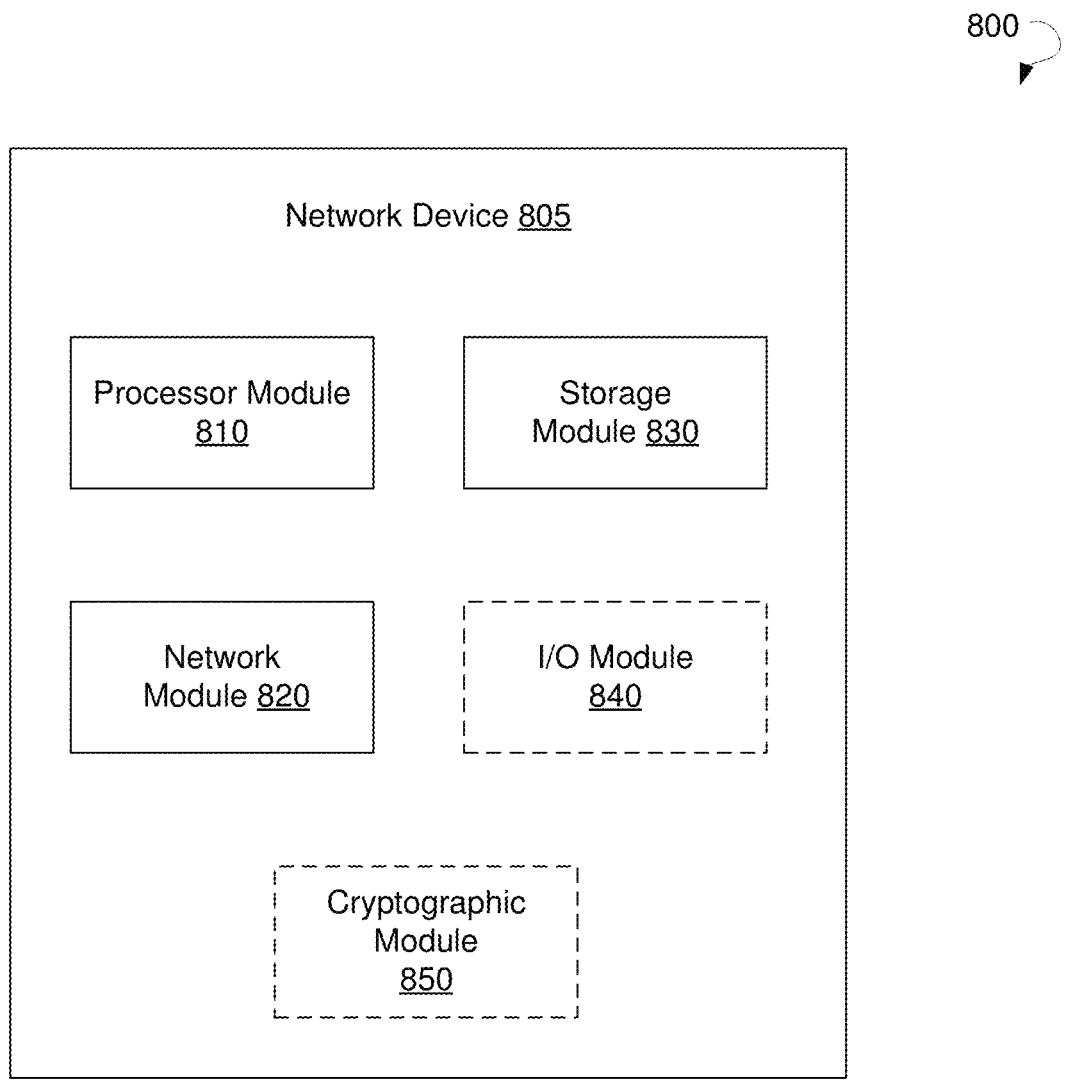
FIG. 8 is a block diagram illustrating a network node.

FIG. 8 is a block diagram 800 illustrating an example embodiment of a network device shown as a network device 805, according to an example embodiment. The network device 805 may include a network computer and may be configured as a data collecting node, a data reporting node, a data processing node, or a storage node. In an example embodiment, the network device 805 may include a processor module 810, a network module 820, a storage module 830, and optionally an input/output (I/O) module 840 and a cryptographic module 850.

The processor module 810 may include one or more processors, which may be a microprocessor, an Intel processor, an Advanced Micro Devices processor, a microprocessor without interlocked pipeline stages, an advanced restricted instruction set computer (RISC) machine-based processor, or a RISC processor. In an example embodiment, the processor module 810 may include one or more processor cores embedded in a processor. The processor module 810 may include one or more embedded processors, or embedded processing elements in a Field Programmable Gate Array, an Application Specific Integrated Circuit, or Digital Signal Processor.

In an example embodiment, the network module 820 may include a network interface such as Ethernet, optical network interface, a wireless network interface, T1/T3 interface, a WAN or LAN interface. In a further example embodiment, the network module 820 may include a network processor.

In an example embodiment, the storage module 830 may include Random-access memory (RAM), Dynamic Random Access Memory, Static Random Access Memory, Double Data Rate Synchronous Dynamic Random Access Memory, or memory utilized by the processor module 810 or the network module 820. The storage module 830 may store data utilized by the processor module 810. The storage module 830 may include a hard disk drive, a solid state drive, an external disk, a Digital Versatile Disc (DVD), a compact disk (CD), or a readable external disk. The storage module 830 may store one or more computer programming instructions which when executed by the processor module 810 or the network module 820 may implement one or more of the functionality of the present disclosure.

The I/O module 840 may include a keyboard, a keypad, a mouse, a gesture based input sensor, a microphone, a physical or sensory input peripheral, a display, a speaker, or a physical or sensual output peripheral. The cryptographic module 850 may include one or more hardware-based cryptographic computing modules to perform data encryption and/or decryption.

Figure 9:
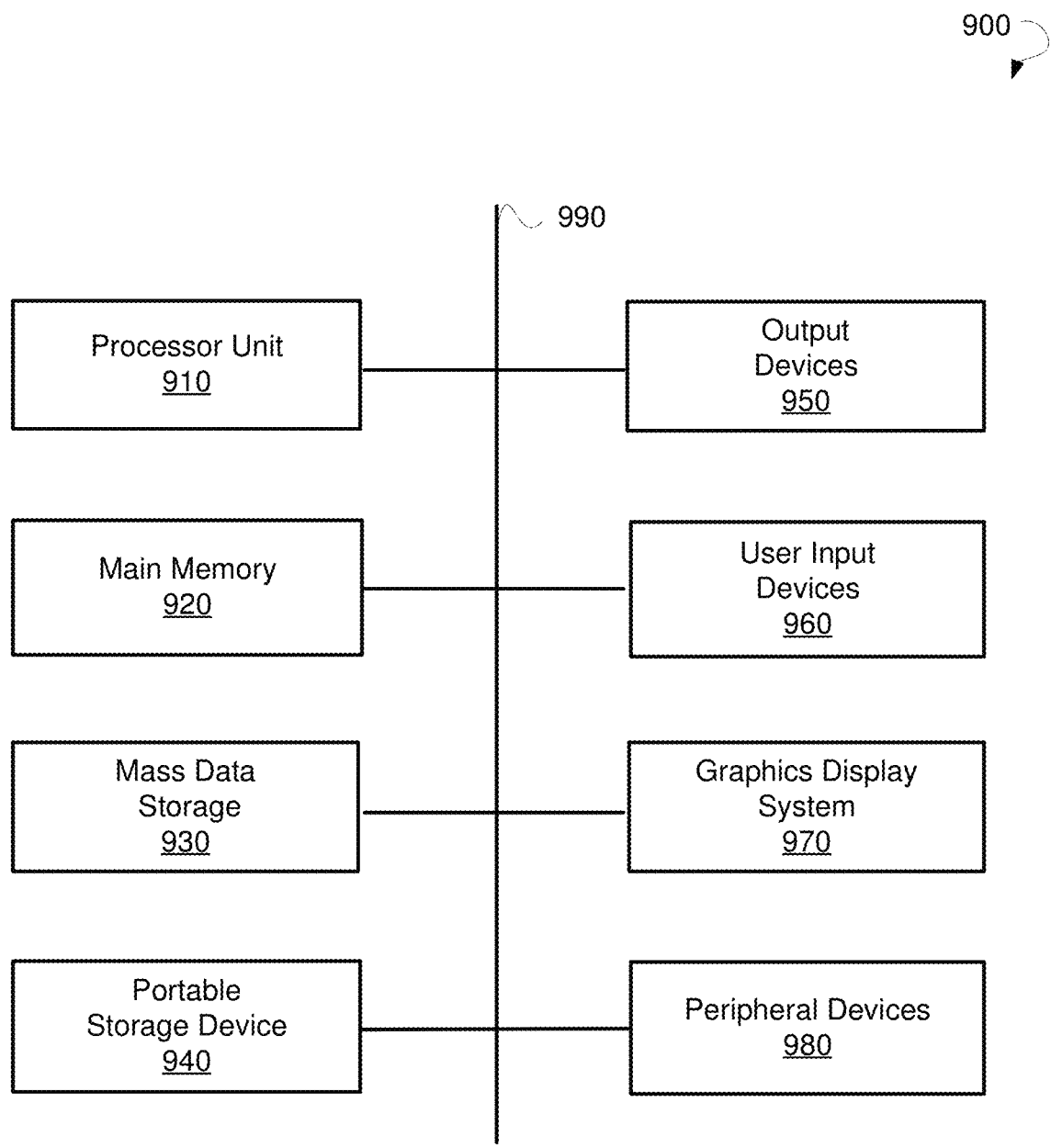
FIG. 9 shows a diagrammatic representation of a computing device for a machine, within which a set of instructions for causing the machine to perform any one or more of the methodologies discussed herein can be executed.

FIG. 9 illustrates a computer system 900 that may be used to implement embodiments of the present disclosure, according to an example embodiment. The computer system 900 may serve as a computing device for a machine, within which a set of instructions for causing the machine to perform any one or more of the methodologies discussed herein can be executed. The computer system 900 can be implemented in the contexts of the likes of computing systems, networks, servers, or combinations thereof. The computer system 900 includes one or more processor units 910 and main memory 920. Main memory 920 stores, in part, instructions and data for execution by processor units 910. Main memory 920 stores the executable code when in operation. The computer system 900 further includes a mass data storage 930, a portable storage device 940, output devices 950, user input devices 960, a graphics display system 970, and peripheral devices 980. The system may be implemented in software that is cloud-based.

The components shown in FIG. 9 are depicted as being connected via a single bus 990. The components may be connected through one or more data transport means. Processor units 910 and main memory 920 are connected via a local microprocessor bus, and mass data storage 930, peripheral devices 980, the portable storage device 940, and graphics display system 970 are connected via one or more I/O buses.

Mass data storage 930, which can be implemented with a magnetic disk drive, solid state drive, or an optical disk drive, is a non-volatile storage device for storing data and instructions for use by processor units 910. Mass data storage 930 stores the system software for implementing embodiments of the present disclosure for purposes of loading that software into main memory 920.

The portable storage device 940 operates in conjunction with a portable non-volatile storage medium, such as a floppy disk, a CD, a DVD, or USB storage device, to input and output data and code to and from the computer system 900. The system software for implementing embodiments of the present disclosure is stored on such a portable medium and input to the computer system 900 via the portable storage device 940.

User input devices 960 provide a portion of a user interface. User input devices 960 include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 includes output devices 950. Suitable output devices include speakers, printers, network interfaces, and monitors.

Graphics display system 970 includes a liquid crystal display or other suitable display device. Graphics display system 970 receives textual and graphical information and processes the information for output to the display device. Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 can be a PC, a handheld computing system, a telephone, a mobile computing system, a workstation, a tablet, a phablet, a mobile phone, a server, a minicomputer, a mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 900, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for decreasing data transfer over a network have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for decreasing data transfer over a network, the system comprising:
 a data collecting node that is a hardware device, the data collecting node being configured to:
  collect a plurality of consecutive datasets having subscriber data for a period of time;
  determine a frequency of a data change for one or more fields of the plurality of consecutive datasets;
  based on the determination, classify data fields of the plurality of consecutive datasets into low frequency change data and high frequency change data, wherein the data fields of the low frequency change data are invariable for the plurality of consecutive datasets and wherein the data fields of the high frequency change data vary for the plurality of consecutive datasets;
  analyze the high frequency change data to select, based on the analysis, an analytical function to approximate the high frequency change data;
  upon the selection of the analytical function, determine function parameters associated with the analytical function, wherein the function parameters include coefficients representing a power of the analytical function;
  combine the plurality of consecutive datasets into a combination dataset, wherein the combination dataset includes one instance of each data field of the low frequency change data and function parameters associated with the analytical function; and
  during the period of time, determine that a number of datasets in the plurality of consecutive datasets reached a predetermined number of datasets; and
 a data reporting node that is a hardware device, the data reporting node being configured to:
  based on the determination that the number of datasets reached the predetermined number of datasets, generate, based on the plurality of consecutive datasets, a combination dataset, wherein the combination dataset includes one instance of each data field of the low frequency change data and aggregated data fields of the high frequency change data from the plurality of consecutive datasets, wherein each of the aggregated data fields stores a sequential list of values of each data field of the high frequency change data of one of the plurality of consecutive datasets; and
  transfer the combination dataset to a data processing node over the network, wherein the data processing node is configured to restore the high frequency change data based on the analytical function and the function parameters.

2. The system of claim 1, wherein the one instance of each data field of the low frequency change data and the aggregated data fields of the high frequency change data are stored in data fields of the combination dataset.

3. The system of claim 2, wherein each of the aggregated data fields of the high frequency change data comprises a plurality of parameters associated with one of the plurality of consecutive datasets.

4. The system of claim 1, wherein the low frequency change data includes subscriber identifying data.

5. The system of claim 4, wherein the subscriber identifying data includes at least one of the following: a subscriber primary unique identifier, a Mobile Subscriber Integrated Services Digital Number (MSISDN), International Mobile Subscriber Identity (IMSI), a user name, a subscriber network identity, a phone number, a media access control (MAC) address, a public Internet Protocol (IP) address, a private IP address, Virtual Local Area Network Identifier (VLAN ID), a vehicle identification number (VIN), a subscriber location information, a tunnel identifier (ID), 3rd Generation Partnership Project (3GPP) location information, subscriber group information, a policy associated with a subscriber, a subscriber location, a source of data traffic, a device type, an Operating System (OS) type, information describing the subscriber, information describing a group of subscribers, and information describing at least one of a device, a host, a household, a data channel, and a neighborhood.

6. The system of claim 1, wherein the data reporting node is further configured to determine that a number of the plurality of consecutive datasets exceeds a predetermined number of consecutive datasets, wherein the combining the plurality of consecutive datasets is initiated based on the determining that the number of the plurality of consecutive datasets exceeds the predetermined number of consecutive datasets.

7. A method for decreasing data transfer over a network, the method comprising:
 collecting, by at least one network device, a plurality of consecutive datasets having subscriber data for a period of time;

determining, by the at least one network device, a frequency of a data change for one or more fields of the plurality of consecutive datasets;

based on the determination, classifying, by the at least one network device, data fields of the plurality of consecutive datasets into low frequency change data and high frequency change data, wherein the data fields of the low frequency change data are invariable for the plurality of consecutive datasets and wherein the data fields of the high frequency change data vary for the plurality of consecutive datasets;

analyzing, by the at least one network device, the high frequency change data to select, based on the analysis, an analytical function to approximate the high frequency change data;

upon the selection of the analytical function, determining, by the at least one network device, function parameters associated with the analytical function, wherein the function parameters include coefficients representing a power of the analytical function;

combining, by the at least one network device, the plurality of consecutive datasets into a combination dataset, wherein the combination dataset includes one instance of each data field of the low frequency change data and function parameters associated with the analytical function;

during the period of time, determining, by the at least one network device, that a number of datasets in the plurality of consecutive datasets reached a predetermined number of datasets;

based on the determination that the number of datasets reached the predetermined number of datasets, generating, by the at least one network device, based on the plurality of consecutive datasets, a combination dataset, wherein the combination dataset includes one instance of each data field of the low frequency change data and aggregated data fields of the high frequency change data from the plurality of consecutive datasets, wherein each of the aggregated data fields stores a sequential list of values of each data field of the high frequency change data of one of the plurality of consecutive datasets; and transferring, by the at least one network device, the combination dataset to a data processing node over the network, wherein the data processing node is configured to restore the high frequency change data based on the analytical function and the function parameters.

8. The method of claim 7, wherein the one instance of each data field of the low frequency change data and the aggregated data fields of the high frequency change data are stored in data fields of the combination dataset.

9. The method of claim 8, wherein each of the aggregated data fields of the high frequency change data comprises a plurality of parameters associated with one of the plurality of consecutive datasets.

10. The method of claim 7, wherein the low frequency change data includes subscriber identifying data.

11. The method of claim 10, wherein the subscriber identifying data includes at least one of the following: a subscriber primary unique identifier, a Mobile Subscriber Integrated Services Digital Number (MSISDN), International Mobile Subscriber Identity (IMSI), a user name, a subscriber network identity, a phone number, a media access control (MAC) address, a public Internet Protocol (IP) address, a private IP address, Virtual Local Area Network Identifier (VLAN ID), a vehicle identification number (VIN), a subscriber location information, a tunnel identifier (ID), 3rd Generation Partnership Project (3GPP) location information, subscriber group information, a policy associated with a subscriber, a subscriber location, a source of data traffic, a device type, an Operating System (OS) type, information describing the subscriber, information describing a group of subscribers, and information describing at least one of a device, a host, a household, a data channel, and a neighborhood.

12. The method of claim 7, further comprising:
determining that a number of the plurality of consecutive datasets exceeds a predetermined number of consecutive datasets,
wherein the combining the plurality of consecutive datasets is initiated based on the determining that the number of the plurality of consecutive datasets exceeds the predetermined number of consecutive datasets.

13. A method for decreasing data transfer over a network, the method comprising:
collecting, by at least one network device, a plurality of consecutive datasets having subscriber data;
determining, by the at least one network device, a frequency of a data change for one or more fields of the plurality of consecutive datasets;
based on the determination, classifying, by the at least one network device, data fields of the plurality of consecutive datasets into low frequency change data and high frequency change data, wherein the data fields of the low frequency change data are invariable for the plurality of consecutive datasets and wherein the data fields of the high frequency change data vary for the plurality of consecutive datasets;
analyzing, by the at least one network device, the high frequency change data to select, based on the analysis, an analytical function to approximate the high frequency change data;
upon the selection of the analytical function, determining, by the at least one network device, function parameters associated with the analytical function, wherein the function parameters include coefficients representing a power of the analytical function;
combining, by the at least one network device, the plurality of consecutive datasets into a combination dataset, wherein the combination dataset includes one instance of each data field of the low frequency change data and function parameters associated with the analytical function; and
transferring, by the at least one network device, the combination dataset to a data processing node over the network, wherein the data processing node is configured to restore the high frequency change data based on the analytical function and the function parameters.

14. The method of claim 13, wherein the one instance of each data field of the low frequency change data and the function parameters associated with the analytical function are stored in data fields of the combination dataset.

15. The method of claim 13, wherein the data processing node is configured to recreate the analytical function based on the function parameters.

16. The method of claim 13, wherein an accuracy of the approximation of the high frequency change data is based on the function parameters.

17. The method of claim 16, where the accuracy increases with an increase in a power of the analytical function.

18. The method of claim 13, wherein the low frequency change data includes subscriber identifying data.

19. The method of claim 18, wherein the subscriber identifying data includes at least one of the following: a subscriber primary unique identifier, a Mobile Subscriber Integrated Services Digital Number (MSISDN), International Mobile Subscriber Identity (IMSI), a user name, a subscriber network identity, a phone number, a media access control (MAC) address, a public Internet Protocol (IP) address, a private IP address, Virtual Local Area Network Identifier (VLAN ID), a vehicle identification number (VIN), a subscriber location information, a tunnel identifier (ID), 3rd Generation Partnership Project (3GPP) location information, subscriber group information, a policy associated with a subscriber, a subscriber location, a source of data traffic, a device type, an Operating System (OS) type, information describing the subscriber, information describing a group of subscribers, and information describing at least one of a device, a host, a household, a data channel, and a neighborhood.

20. The method of claim 13, further comprising:
determining that a number of the plurality of consecutive datasets exceeds a predetermined number of consecutive datasets,
wherein the combining the plurality of consecutive datasets is initiated based on the determining that the number of the plurality of consecutive datasets exceeds the predetermined number of consecutive datasets.

* * * * *